Jan. 1, 1963     J. J. GUERRERO     3,071,171
MELON AND FRUIT CUTTING TEMPLATE
Filed Dec. 8, 1958
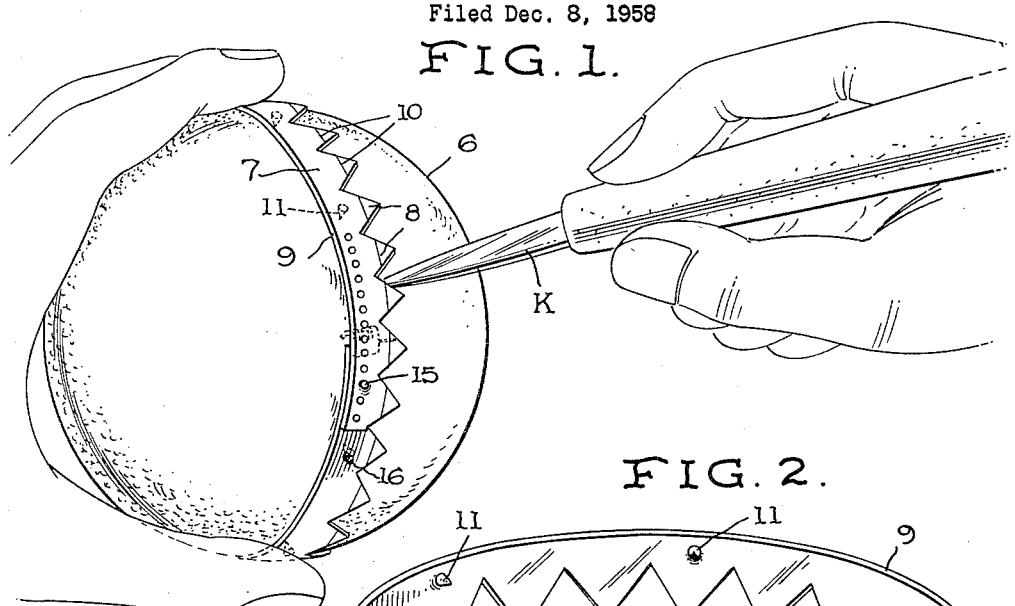
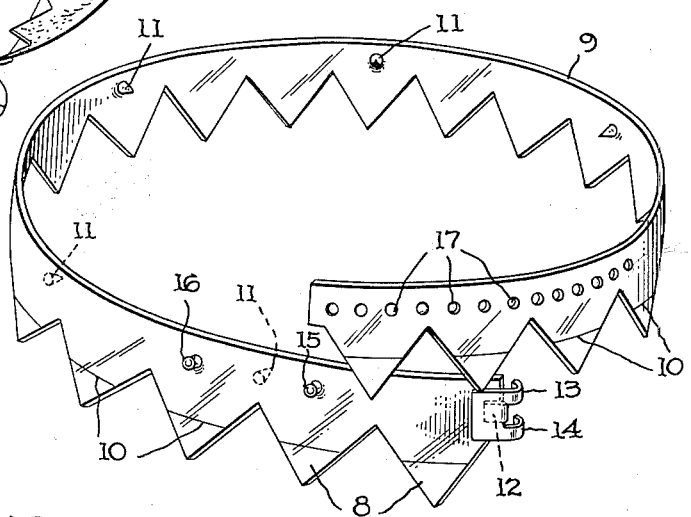
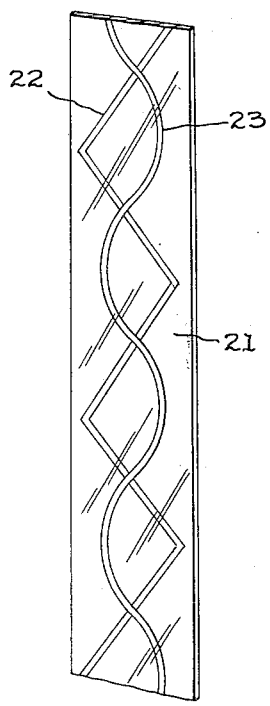
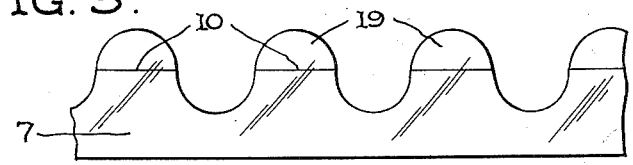
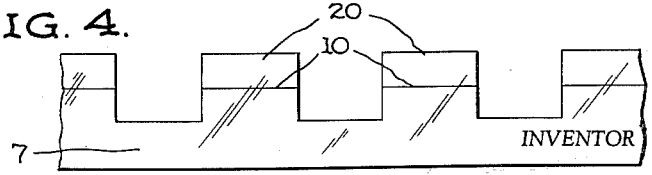
INVENTOR
JOHN J. GUERRERO
BY Cameron, Kerkam & Sutton
ATTORNEYS 3,071,171
MELON AND FRUIT CUTTING TEMPLATE
John J. Guerrero, 1214 7th St., Los Alamos, N. Mex.
Filed Dec. 8, 1958, Ser. No. 778,720
1 Claim. (Cl. 146—150)

This invention relates to an improved template or guide means designed to be used in the cutting and decorating of fruits or melons of the cantaloupe type. The template is designed to assist the halving and decorative cutting or "fluting" of the edges of the halves of a fruit or melon being prepared for human consumption.

In the past when a melon, for example, a cantaloupe, was prepared for consumption a cook bisected the melon at its equator or median line with a knife with the result that the halves were frequently of unequal size and the portions served were not uniform. When it was desired to provide a fluted or scalloped edge to the halves of the fruit or melon the services of a chef were required. The resulting fluted edge was frequently irregular and uneven and left the halves unequal in size and the edges thereof uneven and unpleasing in appearance.

It is therefore a primary object of this invention to provide a template or guide which may be accurately fitted about the median circumference or equator of a fruit or mellon which will provide a guide form of such accuracy that the most unskilled worker may readily and accurately bisect the fruit and may simultaneously cut a symmetric design in the severed edges thereof.

It is a further object of this invention to provide such templates or guides in varied designs whereby the cut edges of the fruit or melon may be uniformly angular or curved to provide a uniform pattern about the edges of the severed halves to enhance their appearance and add to their attractiveness.

It is a further object of this invention to provide such a template which will assure uniform halving and ornamenting of the hemispheres of the article.

It is another object of this invention to provide such a template or guide which will be readily adaptable to fruits or melons of varying diameters and which may be conformed readily to the largest or smallest of such fruits or melons.

It is a further object of this invention to provide a guide of this type upon a transparent adhesive strip which may be adhesively applied about the equator of a fruit or melon to guide the cutting or bisecting thereof in the desired design.

Other and further objects of this invention will become apparent as this specification proceeds.

Referring to the drawings, FIG. 1 is a perspective view of a fruit or melon with the novel template or guide applied about its equator, showing a knife blade in operation over the serrated edge of the template to bisect the fruit or melon and to provide a uniform angular design in the severed edges of the hemispheres thereof;

FIG. 2 is a perspective view of one embodiment of the template in "opened" condition prior to application about a fruit or melon;

FIG. 3 is a fragmentary view of another embodiment of such a template in which the serrations are curvilinear;

FIG. 4 is a partial fragmentary view of a segment of such a guide or template in which the operating edge thereof is in rectangular form; and FIG. 5 is a fragmentary view of a strip of transparent adhesive material bearing alternative designs and adapted to be adhesively applied about the equator of a fruit or melon, the designs thereon providing a guide for the knife of the operator severing the fruit or melon.

In the drawings, FIG. 1, the fruit or melon being cut is designated as 6. Applied about the equator or median line of the fruit or melon 6 is a template or guide 7 which may be formed of any appropriate flexible material, i.e., plastic, Celluloid, flexible metal, cardboard or other appropriate material. Template 7, as shown may be of any desired length and should be of sufficient length to completely encircle the largest fruit or melon to be cut. As shown in FIG. 1, one edge of the template 7 is angularly serrated to provide a uniform series of triangular projections 8 about one peripheral edge thereof. The reverse edge 9 of template 7 is preferably a straight edge.

As shown, a centering line 10 is provided across the centers of projections 8 to assist in aligning the template accurately over the equator of the item being cut.

Provided about the interior of this embodiment of the template 7 are a series of small, internally projecting spikes or pins 11 which are designed to seat in the skin of the fruit or melon to assist in maintaining the template or guide in proper position about the equator thereof. As shown, a series of six such pins 11 are provided about the interior surface of the template 7 and are disposed substantially at an angle of 60° to each other thereabout. The number of such pins 11 may be varied as desired, depending upon the type of fruit or melon being cut.

Terminal retaining hook member 12 is provided at one extremity of the template or guide and is affixed thereto permanently, as by crimping or cementing and is provided at its outer extremity with inwardly curved hook members 13 and 14 which are designed to be driven into the skin of the fruit or melon to act as an initial retention means for the template 7 during its application about the median circumference or equator thereof.

Extending outwardly from the outer peripheral surface of this extremity of the template 7 are studs 15 and 16 which are appropriately cemented or affixed thereinto and which extend rectilinearly therefrom an appreciable distance. The opposite end of the template is provided with a series of holes or perforations 17 of slightly smaller diameter than studs 15 and 16 and designed to be registered thereover when the template is affixed about the median circumference of a fruit or melon to be cut, as will hereinafter be discussed in more detail. It will be noted that perforations 17 are provided along the median line of the base section of the template for substantially one-fourth of its length to provide wide adjustability to conform it to fruits or melons of varying diameters, from small to large.

As aforesaid, median line 10 is preferably provided across the center of triangular projections 9 of template 7 to assist in the proper centering of the template over the exact equator of a fruit or melon to be severed. Such a median line is also preferably provided in all embodiments of the template.

In the embodiment of the invention shown in FIG. 3 the operating edge of template 7 is preferably smoothly curved in recurrence to provide a series of uniform curved projections 19 where it is desired to cut the edges of the hemisphere of the fruit or melon in a smoothly curved design. Median line 10 is provided across projections 19 to assist in aligning the template over the equator or the item being cut.

In the embodiment shown in FIG. 4, the operating edge of the template 7 is provided with a series of equal rectangular projections 20, where it is desired to provide symmetrical rectangular cuts about the edges of the hemispheres of the fruit or melon being operated upon. Here again, a median line 10 is provided across projections 20, for aligning the template.

In the embodiments of the invention shown in FIGS. 1–4, inclusive, the template 7 is formed of reasonably heavy, flexible plastic, Celluloid, cardboard or analogous material and after alignment of the median line 10 of the template projections with the equator of the item to be cut the template is then forced downwardly thereover and is held in position by means of pins 11, hooks 13 and 14, bores 17 and studs 15 and 16 thereof.

In the embodiment of the invention shown in FIG. 5 an alternative concept is illustrated in which a strip of transparent adhesive tape material such as "Scotch tape" or other plastic adhesive tape 21 is provided with one or more symmetrical imprinted designs 22 or 23 extending longitudinally thereof. In this embodiment of the invention the adhesive tape is preferably unrolled to a sufficient length to extend about the equator of fruit or melon to be cut and is then adhesively applied thereabout, centered over the equator of the fruit or melon. With the adhesive tape so in position about the item the operator may then follow with his knife blade the desired pattern 22 or 23 on the adhesive tape 21 to accurately sever the melon or fruit into two halves and provide the severed edges with the desired angular or curvilinear symmetrical design. While only two designs are shown in FIG. 5 it will be understood that the adhesive tape may be provided with any desired number and shape of designs, depending upon the edge desired in the hemispheres of the severed fruit or melon.

It will be understood that the embodiment of the invention shown in FIG. 5 comprises a thin, preferably transparent adhesive tape of the "Scotch" type which is readily severable and designed to be adhesively applied with its center line over the equator of the fruit or melon to be severed. After the cut has been made along the desired indicia on the tape, the two halves of the tape are then removed from the edges of the severed halves of the fruit or melon.

Various means may be employed for joining the extremities of the embodiment of the template shown in FIGS. 1-4, inclusive, other than the perforations and studs shown in FIGS. 1 and 2. Thus, for example, a length of elastic band may be affixed and looped at one extremity of the template to fit over an appropriate stud extending outwardly from the other extremity, providing an elastic and readily adjustable union between the two extremities of the template. If desired, the extremities of the template may be joined by a resilient metal clip of U-shaped structure fitted downwardly over both extremities of the template after it has been applied over the fruit with its extremities applied over each other.

Various other types of joining means may be utilized.

As has been previously stated, in both embodiments of the invention the template strip is preferably of greater length than the greatest circumference or equator of the fruit or melon to be ornamentally cut. In using the embodiments of the template shown in FIGS. 1-4, inclusive, the template being formed of flexible material, the template is applied about the equator of the fruit or melon with the median line 10 of its projections lying directly over the equator thereof, in order that the halves of the severed fruit or melon may be equal. The template is held in place by terminal hooks 13 and 14 at one extremity thereof and its alignment about the circumference of the fruit or melon is maintained by means of small pins 11 which penetrate into the skin just far enough to maintain the template firmly in position. With the template properly positioned over the equator of the fruit or melon, perforations 17 are applied over studs 15 and 16 to complete the seating of the template on the fruit. The operator then takes thin bladed knife K and as shown in FIG. 1, cuts completely through the rind and meat, following the convolutions of the serrated edge of the template completely about the equator of the melon or fruit until the hemispheres thereof are completely severed. The halves of the item being cut are then separated and the template structure is removed from that half to which it was originally affixed.

In using the embodiment of the invention shown in FIG. 5, comprising a transparent, thin adhesive tape material of the "Scotch" type, formed of Pliofilm, polyethylene, or other synthetic plastic material, the tape is adhesively applied about the melon with its median line lying in the same plane as the equator of the melon. With the tape thus adhesively attached completely about the equator of the melon, a knife is inserted through the tape and melon, on the desired line on the tape, and a cut is then made completely about the equator of the melon, following the desired line on the tape. When severance is complete and the melon is halved, the two halves are separated and the respective portions of the tape are removed from the edges of the halves thereof.

As aforesaid, the template structure disclosed enables a novice to cut a melon or analogous fruit in two perfectly symmetrical halves, at the same time providing the cut edges of the hemispheres thereof with accurate and symmetrical designs, either angular or curvilinear and of exact uniformity. It greatly facilitates such cutting, materially decreases the time previously required for such an operation and assures a perfectly symmetrical cut.

It will be understood that the template is primarily designed for use with melons of the cantaloupe or honeydew type in which the center of the melon is open or hollow and contains a comparatively loose mass of seeds and pulp. In severing melons of this type the knife blade is inserted completely through the rind and meat until the tip or point of the knife penetrates the central cavity of the melon. If the template is used with "solid" melons or fruits each stroke of the blade must penetrate to the diametric center of the fruit in order that complete severance of the halves thereof may be accomplished.

This invention is susceptible of numerous embodiments without departing from the spirit thereof. The designs in the operating edge of the template may be varied at will, depending upon the nature of the artistic design desired in the exposed edges of the halves of the severed melon or fruit.

As aforesaid, the means of attaching the opposed extremities of the template after application about a melon or fruit may be varied at will and may take many forms, within the spirit of the invention.

Regarding the embodiment shown in FIG. 5, various symmetrical designs may be imprinted upon the non-adhesive face of the tape, as shown in FIG. 5. They may be angular, curvilinear, rectangular or of any other desired design.

This specification is by way of illustration only. Attention is directed to the appended claim for a limitation of the scope of the invention.

What is claimed is:

In a template for use in cutting melons and fruit, a flexible body strip, a symmetrical design cut into one edge of said strip, pin means about the interior of said strip registering in the skin of the melon to hold said strip in position thereabout, inwardly curved hook means at one extremity of said strip to maintain said extremity thereof firmly in position against the outer surface of said melon, stud means extending outwardly from said extremity of said strip, a series of aligned perforations in the opposite end of said strip selectively fitting over said stud means whereby said strip may be firmly held in position about the equator of a melon and acts as a guide for a knife in cutting the melon.

References Cited in the file of this patent

UNITED STATES PATENTS

| | | |
|---|---|---|
| 971,519 | Brannen | Oct. 4, 1910 |
| 1,064,301 | Donegan | June 10, 1913 |
| 1,278,779 | Springer | Sept. 10, 1918 |
| 1,482,735 | Catsules | Feb. 5, 1924 |
| 1,901,908 | Hoyos | Mar. 21, 1933 |
| 2,249,764 | Hothersall | July 22, 1941 |